US012699787B2

(12) United States Patent
Megerdichian et al.

(10) Patent No.: US 12,699,787 B2
(45) Date of Patent: Aug. 4, 2026

(54) Loop8 QUORUM ACCESS SYSTEM AND METHOD

(71) Applicant: L8P8, Inc., Glendale, CA (US)

(72) Inventors: Zarik Megerdichian, La Canada Flintridge, CA (US); Alex Perlovich, Tarzana, CA (US); Andy Ansryan, Sherman Oaks, CA (US)

(73) Assignee: L8P8, Inc., Glendale, CA (US)

( * ) Notice: Subject to any disclaimer, the term of this patent is extended or adjusted under 35 U.S.C. 154(b) by 0 days.

(21) Appl. No.: 19/052,143

(22) Filed: Feb. 12, 2025

(65) Prior Publication Data

US 2025/0258901 A1 Aug. 14, 2025

Related U.S. Application Data

(60) Provisional application No. 63/553,329, filed on Feb. 14, 2024.

(51) Int. Cl.
*G06F 21/60* (2013.01)
*G06F 21/40* (2013.01)
*H04L 9/40* (2022.01)

(52) U.S. Cl.
CPC ............ *G06F 21/604* (2013.01); *G06F 21/40* (2013.01); *G06F 21/602* (2013.01); *H04L 63/08* (2013.01)

(58) Field of Classification Search
CPC ...... G06F 21/40; G06F 21/602; G06F 21/604; H04L 9/32–3213; H04L 9/3226–3228; H04L 63/08–0815; H04L 63/0853; H04L 63/10; H04L 63/102
See application file for complete search history.

(56) References Cited

U.S. PATENT DOCUMENTS

| | | | |
|---|---|---|---|
| 2018/0176017 A1* | 6/2018 | Rodriguez | H04L 63/20 |
| 2021/0056545 A1* | 2/2021 | McCauley | G06Q 20/3226 |
| 2024/0004983 A1* | 1/2024 | Tewari | G06F 21/34 |

* cited by examiner

*Primary Examiner* — Kevin Bechtel

(57) ABSTRACT

A method of providing secure access to a software object including generating quorum voting requirements for the software object and storing the quorum voting requirements for the software object in a quorum requirements table, wherein the quorum requirements table is resident in quorum access software; receiving a request for a user account and establishing the user account with user parameters for a user; generating a QR code for the user and communicating the QR code to the user computing device; scanning the QR code on the user computing device that the user is utilizing to access the software object; logging into, by the user computing device, a software application including the software object, and transmitting, by the user computing device, an access request with respect to the software object; receiving the access request at the identity management system software, and transmitting the received access request to the quorum access software.

8 Claims, 3 Drawing Sheets

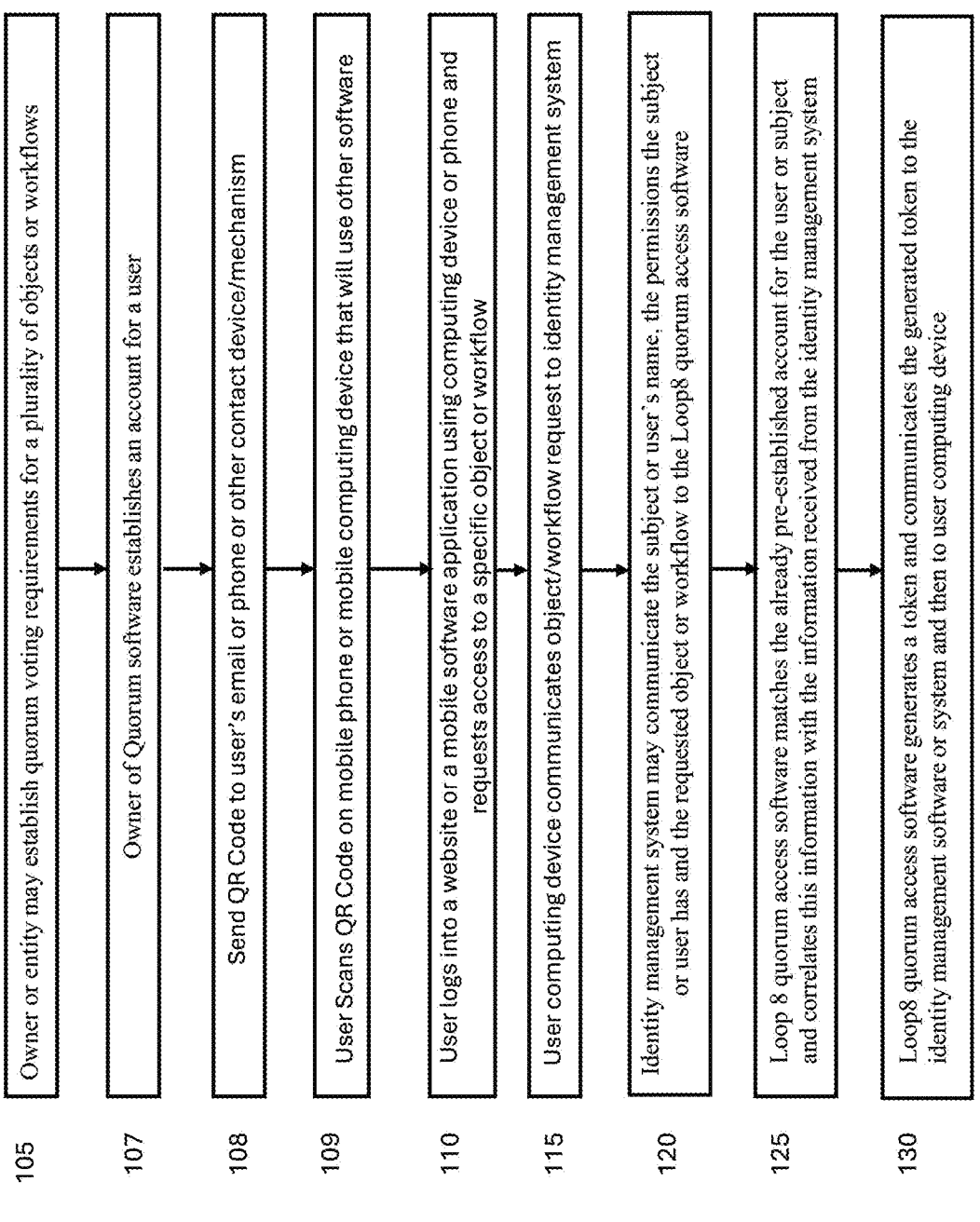

105 — Owner or entity may establish quorum voting requirements for a plurality of objects or workflows

107 — Owner of Quorum software establishes an account for a user

108 — Send QR Code to user's email or phone or other contact device/mechanism

109 — User Scans QR Code on mobile phone or mobile computing device that will use other software

110 — User logs into a website or a mobile software application using computing device or phone and requests access to a specific object or workflow

115 — User computing device communicates object/workflow request to identity management system

120 — Identity management system may communicate the subject or user's name, the permissions the subject or user has and the requested object or workflow to the Loop8 quorum access software

125 — Loop 8 quorum access software matches the already pre-established account for the user or subject and correlates this information with the information received from the identity management system

130 — Loop8 quorum access software generates a token and communicates the generated token to the identity management software or system and then to user computing device

FIG. 1A

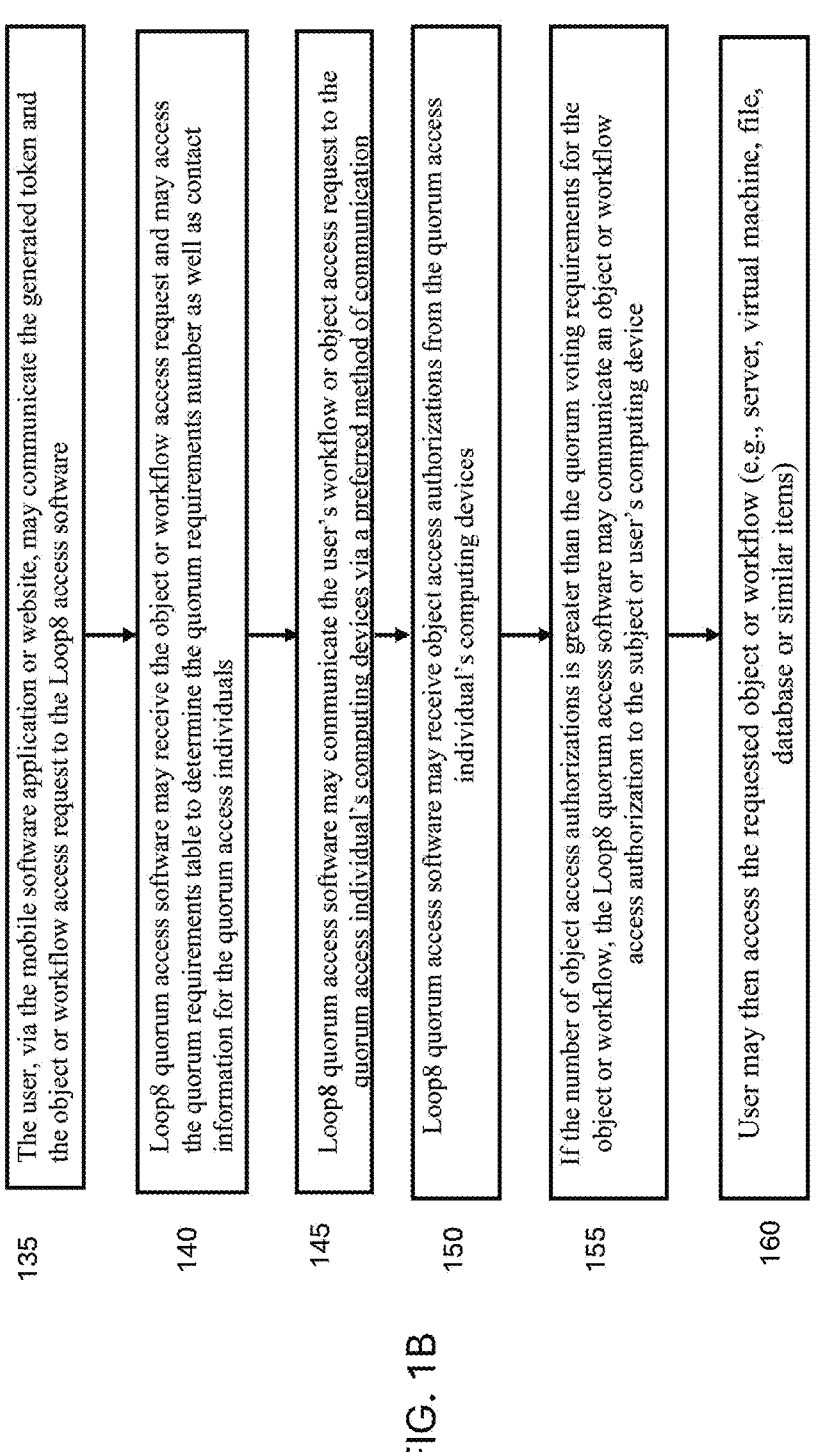

135 The user, via the mobile software application or website, may communicate the generated token and the object or workflow access request to the Loop8 access software 140 Loop8 quorum access software may receive the object or workflow access request and may access the quorum requirements table to determine the quorum requirements number as well as contact information for the quorum access individuals 145 Loop8 quorum access software may communicate the user's workflow or object access request to the quorum access individual's computing devices via a preferred method of communication 150 Loop8 quorum access software may receive object access authorizations from the quorum access individual's computing devices 155 If the number of object access authorizations is greater than the quorum voting requirements for the object or workflow, the Loop8 quorum access software may communicate an object or workflow access authorization to the subject or user's computing device 160 User may then access the requested object or workflow (e.g., server, virtual machine, file, database or similar items)

FIG. 1B

Loop8 QUORUM ACCESS SYSTEM AND METHOD

BACKGROUND

There are many cybersecurity threats that system operators need to be aware of when running software on their systems. In many cases, different parts of a system, e.g., different workflows or objects may have different security needs but there are not easy ways to provide different levels of security for different workflows or objects. Many parts of a system require extensive security because of the type of data that is being stored in the object (e.g., a database) or used in the workflow. A need exists for a system or method for allowing system operators or developers to able to assign different access requirements for different objects or workflows.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIG. 1A is a flowchart illustrating a quorum access software method according to exemplary embodiments;

FIG. 1B is a flowchart illustrating a quorum access software method according to exemplary embodiments.

DETAILED DESCRIPTION

Figure 2:
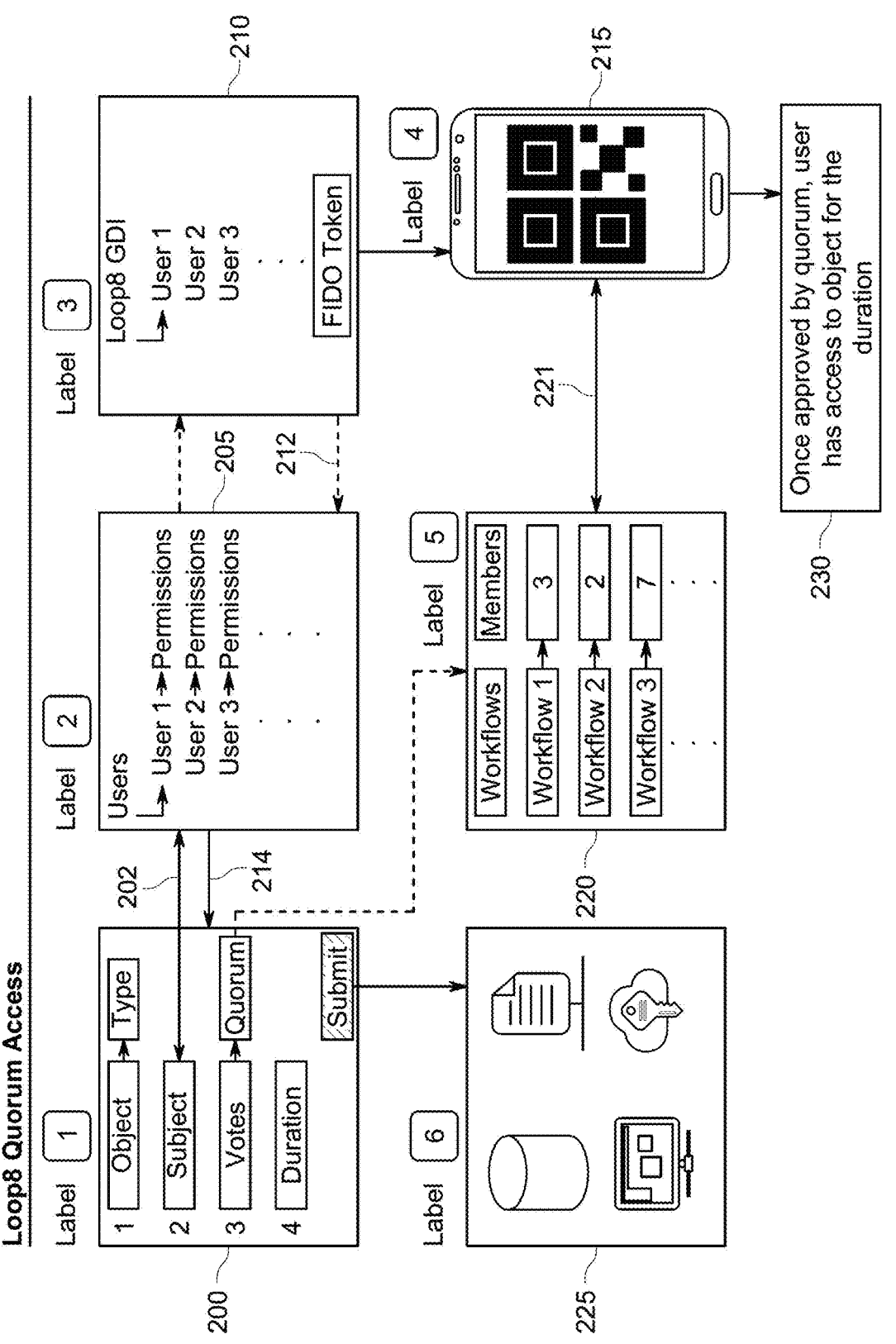
FIG. 2 illustrates a data flow diagram of a Loop8 Quorum access system or method according to some embodiments.

The following detailed description and claims provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Described herein is a system and method for providing secure access to existing software objects, software workflows, virtual machines, databases, files, servers or similar items. In exemplary embodiments, a quorum of subjects (e.g., people on devices) approve access to users for objects, virtual machines, files, servers, databases or similar items. In other words, for each of the individual objects, virtual machines, files, servers, databases or similar items, a set number of subjects (e.g., a quorum or individuals) must approve access for a new user. In exemplary embodiments, the set number of subjects may vary per object, e.g., a database may have a quorum of 3, a file may have a quorum of 5, and a server may have a quorum of 7.

Software may refer to computer-readable instructions that are stored in one or more memory devices and that may be executable by one or more processors or controllers. Software modules, software components, software blocks or software portions may be collections or groups of software or computer-readable instructions that may be executable by one or more processors and may perform inter-related functions and/or processes. Software applications or software packages may be one or more software modules, components, blocks or portions that are provided together to users and/or entities for specific functions or processes. Software modules, components, blocks or portions, as well as software applications and/or software packages, may include a number of software objects or software workflows that may be executable by the one or more processors or controllers and may control operation of specific features and/or functions of the software. In the application herein, quorum access software, identity management software or other software may also be referred to as quorum access module(s) or identity management software module(s).

FIG. 1A is a flowchart illustrating a quorum access software method according to exemplary embodiments. FIG. 1B is a flowchart illustrating a quorum access software method according to exemplary embodiments. In step 105, in exemplary embodiments, an owner or entity of the system or software may establish quorum voting requirements for a plurality of objects or workflows in the system or software (or their system, website and/or software application. These quorum voting requirements, the software workflow or software object name, and any quorum access individual's names and/or associated computing devices, along with preferred contact information) may be stored in a table in the Loop8 quorum access software, which may be referred to as the quorum requirements table. The Loop8 quorum access software may be referred to as quorum access software and it may be installed on a software application owner's computing device or server and/or on a cloud computing device (in some cases owned by the quorum access software owner). In step 107, in exemplary embodiments, the owner or entity of the Loop8 Quorum Access software (or quorum access software) may establish an account for a user or subject by inputting a user's information (including but not limited to username) and mobile computing device information. In step 108, in exemplary embodiments, once the user's account is setup, the Loop8 Quorum Access software (or quorum access software) may send a QR code or a link to the user's email. In alternative embodiments, the Loop8 quorum access software (or quorum access software) may send a message or a notification to the user's or subject's mobile communication device or phone. In step 109, in exemplary embodiments, the user may scan the QR code on his mobile phone or mobile computing device in response to the message or click on the link. In step 110, in exemplary embodiments, a subject or user may be utilizing a mobile software application or a website of another party and may request access to a specific software object or software workflow of the mobile software application and/or website. This logging into the other party's mobile application software or website or server software may occur right after the user or subject is registered with the quorum access software or may occur at a later time. In step 115, in exemplary embodiments, the subject or user (through their computing device may communicate the software object or workflow access request to an identity management system, server, software, and/or computing device. The identity management system may include information about which permissions the subject or user has with respect to software objects or workflows. These permissions may include whether or not the subject or user has access to the software objects or workflows, whether they can view any information in the software object or workflow, or whether they can edit or change any information in the software object or workflow. In step 120, in exemplary embodiments, the identity management system, software, computing device or server may communicate the subject or user's name, the permissions the subject or user has and the requested software object or software workflow to the quorum access software. In step 125, in exemplary embodiments, the quorum access software (or quorum access software) may match and/or compare the already pre-established account for the user or subject and correlates this information with the information received from the identity management system, software, server and/or computing device.

In step 130, in exemplary embodiments, the quorum access software may generate a token and communicate the generated token to the identity management software, system, server and/or computing device. In implementations, the identity management software, server, computing device and/or system may then communicate the generated token to the subject or user via the mobile computing device on which the user scanned the QR code, which is the mobile computing device that is requesting access to the software object or software workflow at the mobile software application, server software application and/or website of another party or a third party.

In step 135, in exemplary embodiments, the subject or user, via the mobile software application or website, may communicate the generated token and the software object or software workflow access request to the quorum access software. In step 140, in exemplary embodiments, the quorum access software may receive the software object or software workflow access request and may access the quorum requirements table to determine the quorum requirements number as well as contact information for the quorum access individuals. In step 145, in exemplary embodiments, the quorum access software may communicate the subject's or user's software workflow or software object access request to the quorum access individual's computing devices via a preferred method of communication. In exemplary embodiments, the request may be in the form of an authentication request via an authentication app or via messages or emails to quorum access computing devices and/or users. In step 150, in exemplary embodiments, the quorum access software may receive software object or workflow access authorizations from the quorum access individual's computing devices and/or quorum access individuals. In step 155, in exemplary embodiments, if the number of software object access authorizations is greater than the quorum voting requirements for the software object or software workflow, the quorum access software may communicate a software object or software workflow access authorization to the subject or user's computing device or to the user via a mobile software application. In step 160, the subject or user may then access the requested software object or software workflow (e.g., server, virtual machine, file, database or similar items) in the other mobile software application, server software application and/or computing device. In some embodiments, the user or subject may need to follow this access authorization process each time they request to access the object or workflow. In other cases, the token may only be for a certain period of time (30 minutes, 15 minutes, one hour or other timeframes), and once that time expires, the user or subject may need to utilize the process described immediately above in FIGS. 1A and 1B. As noted previously, a software application may include a number of different software objects or software workflows, and each of these may have different access requirements. As an example, a database may have a quorum access requirement of 7 people, wherein specific files relating to other parts of the application may only have a quorum access of 3 people because they contain less personal or secure information.

FIG. 2 illustrates a data flow diagram of a Loop8 Quorum access (or quorum access access) system or method according to some embodiments. Quorum access software module may be utilized interchangeably with the phrase quorum access software. Identity management software module may be utilized interchangeably with identity management software. In exemplary embodiments, an object may have multiple workflows. In exemplary embodiments, as illustrated in Label 1 200, a user or subject may select a software object or software workflow to access (which may have a specific type such as a financial workflow, a content access workflow, a content storage object, a human resources or employee records access or object). Label 6 225 illustrates different software objects or software workflows such as databases, files, virtual machines, employee records workflows, financial workflows, content access workflows, etc. In some cases, the user or subject may also be requesting software workflow or software object access for a specific duration. In exemplary embodiments, as illustrated in Label 5 220, the software objects or software workflows may have different quorum vote requirements or quorum voting requirements (e.g., a number of votes or authorizations needed in order to allow access to the specific software object or software workflow). In some implementations, the Loop8 Quorum or quorum access software 230 may store an index of the software workflows or software objects and the associated quorum vote or voting requirements for all the objects (e.g., the quorum requirements table) in a database on a quorum access server computing device or in quorum access software. Further, the index or quorum requirements table 220 may also include which specific individuals and/or associated computing devices that may be contacted in order to meet the quorum voting requirements (e.g., who may be referred to as quorum access individuals). In some implementations, there may be more individuals and/or associated computing devices (or authorization identifiers) listed in the index (or quorum requirements table) than the quorum voting requirement value or number. In other implementations, a number of individual names and contact information (e.g., device or software application information) may be the same number as the quorum voting requirement number or value (e.g., 3 individuals (or computing devices or identifiers) may be contacted and the quorum voting requirement may also be 3). This index may be referred to as the quorum requirements table. In some implementations, the quorum requirements table may also include a time duration for the workflow access (e.g., the user may only be allowed 30 minutes, 15 minutes, 10 minutes, an hour or additional timeframe) of access to the software object or workflow).

As an illustrative example, in FIG. 2, Label 5 220 illustrates a quorum requirements table listing software workflows or software objects and quorum access requirements where workflow or object 1 may have a Quorum vote or voting requirement of 3; workflow or object 2 may have a Quorum vote or voting requirement of 4; and workflow or object 3 may have a Quorum vote or voting requirement of 7. In some implementations, the different workflows or objects may be for the same object (e.g., a database may have three workflows for different parts of the database). In other implementations, each different workflow may be associated with different software objects or software workflows (e.g., a database may have one workflow or object; a virtual machine may have one workflow or object; a server may have a different workflow or object; a financial workflow may have a separate workflow or object; an employee records workflow or object may have a separate workflow or object). The discussion below is focused on one software application or program having one software workflow or object.

In exemplary embodiments, a subject or user (or user computing device or software) may be running a software application or may be interacting with a website, a server software application or a mobile software application of another and may request to access a software object or software workflow of the website, server software application or mobile software application. In some implementations, the software object or workflow may be one of the types of objects or workflows discussed above (e.g., databases, files, servers, virtual machines, employee records request, financial information request, content access or editing request or similar items), as illustrated in Label 1 200. In exemplary embodiments, a requesting user may be known as a subject and information may be input for the subject or may exist for the subject. In exemplary embodiments, the subject or user's name may be communicated to an identity management system, as illustrated by reference number 202. Label 2 205 represents a identity management system or identity management software. The identity management system may be located on local computing devices (or on the same computing devices or servers that the website, server software application or mobile software application that is being accessed is resident or installed thereon). In other implementations, the identity management system or software may be installed on cloud computing devices. In exemplary embodiments, the identity management system or software may include a plurality of users (e.g., users or subjects 1, 2 and 3 as illustrated in Label 2 205) who each have existing permissions. In this implementation, the requesting user or subject does not have access permission to communicate and/or utilize the requested software object or software workflow and may be utilizing the quorum access software to attempt to gain access to the requested software object or workflow. In some embodiments, the identity management system or software 205 may be Microsoft Active Directory, Azure or Okta.

In exemplary embodiments, the subject (or user) may then communicate with the Loop8 Quorum Access software or quorum access software. Label 3 210 illustrates a portion of Loop8 Quorum Access Software or quorum access software. In some implementations, the quorum access software may be installed on one or more local computing devices (or on the same computing devices or servers that the website, server software application or mobile software application that is being accessed is resident or installed thereon). In other implementations, the quorum access software may be installed on cloud computing devices. In exemplary embodiments, the quorum access software matches an already pre-established account for the requesting subject or user. As an illustrative example, user 1 may be Zarik, user 2 may be Mark and user 3 may be Paolo. In exemplary embodiments, the quorum access software may correlate information in the identity management system or software 205 about the subject or user with the information about the subject or user in the quorum access software 210. In exemplary embodiments, the quorum access software may then generate a token and may communicate the generated token back to the user or subject's account in the identity management system or software (the transmission of which is illustrated by reference number 212). In some implementations, the generated token may be a FIDO token.

In exemplary embodiments, the generated token may be communicated from the identity management system or software 205 to the subject or user's computing device which has requested access to the software object or software workflow via the mobile software app, server software application or website, the transmission of which is illustrated by reference number 214. In exemplary embodiments, once the subject or user's computing device or software application has received the generated token, the subject or user (or user's computing device or software) may communicate the requested software object or software workflow to the quorum access software and specifically the portion of the quorum access software that includes the quorum requirements table 220 (Label 5). In exemplary embodiments, the quorum access software may retrieve the quorum access individual's names from the quorum requirements table and may communicate with the quorum access individual's computing devices through their established contact method (e.g., authentication or authorization request, authorization request through authentication software, an email; SMS text; message or phone call). In exemplary embodiments, the quorum access software may receive access authorization responses from the quorum access individual's computing devices or software. In exemplary embodiments, once the quorum access software receives enough access authorization responses (e.g., equal to or greater than the quorum voting requirement) from the quorum access individual's computing devices or software, the quorum access software may communicate to the subject or user's computing device (or software) that the user may access the requested software object or software workflow of the mobile application software, the server software application or website (e.g., the quorum access software may communicates an object access authorization), the communication of which is illustrated by reference number 221 and Label 4 215). In some implementations, the object or workflow access authentication may include an access duration parameter (e.g., the subject or user is allowed a specified timeframe of access, which may be 10 minutes, 30 minutes or 60 minutes). In other implementations, there may be no access duration timeframe parameter so there is no limit on the time of access. As illustrated by reference number 230, once the user or subject has been approved by the quorum individual's computing devices or software and meets the quorum access requirement, the subject or user has access to the software object or software workflow for the timeframe duration. Examples of workflows or objects (or software workflows or software objects) that may have different quorum voting requirements and/or access requirements may be: a first software object that provides general information about a company (number of employees, products sold, pricing); 2) a second software object that provides access to human resource policies for a company (which is a little more sensitive to the company and thus protected); 3) a third software object that provides access to employee pay records or company non-public financial data, such as internal accounting and tax data; and 4) a fourth software object for accessing employee performance data (e.g., identifying promotional candidates or poor performers). An additional example of software workflows or software objects that may have different quorum voting requirements or access requirements may be: a newspaper or content site that has a first software object or software workflow for accessing the free content on the website; a second software object or workflow for accessing the paid content on the website; and a third software object or workflow for accessing a chatbot on the website where each of these software objects have different levels of voting requirements.

In exemplary embodiments, a method of providing secure access to one or more software objects, includes generating quorum voting requirements for the one or more software objects and storing the quorum voting requirements for the one or more software objects in a quorum requirements table, wherein the quorum requirements table is resident in quorum access software; receiving a request for a user account and establishing the user account with user parameters for a user; generating a QR code for the user and communicating the QR code to the user computing device, the QR codes based at least in part on the user parameters; scanning the QR code on the user computing device that the user is utilizing to access the one or more software objects; logging into, by the user computing device, a software application including the one or more software objects, and transmitting, by the user computing device, an access request with respect to at least one of the one or more software objects; receiving the access request at the identity management system software, and transmitting the received access request to the quorum access software; comparing the received access request and associated parameters to the user account with the user parameters stored in the quorum access software; generating a user token and communicating the user token to the identity management software if the associated parameters and the user parameters match; receiving, at the user computing device, the user token from the identity management system software; and communicating, by the user computing device, the user token and the access request for the at least one of the one or more software objects to the quorum access software.

In exemplary embodiments, the method of providing secure access to the one or more software objects further includes verifying, at the quorum access software, the user token; accessing the quorum requirements table for the at least one of the one or more software objects and retrieving the quorum voting requirements and associated voting communication parameters; and communicating, to a plurality of computing devices or quorum individual software packages, the access request for the at least one of the one or more software objects based at least in part on the associated voting communication parameters.

In exemplary embodiments, the method of providing secure access to the one or more software objects further includes receiving, at the quorum access software, a number of object access authorizations for the at least one of the one or more software objects requested by the user computing device; comparing the number of object access authorizations received from the plurality of computing devices or the quorum individual software packages for the at least one software object to the quorum voting requirements for the at least one software object; and if the number of object access authorizations is greater than or equal to the quorum voting requirements for the at least one software object, communicating an object access authorization command to the user computing device so that the user computing device can access the at least one of the one or more software objects of the software application. The method of providing secure access for the one or more software object further includes wherein the quorum voting requirements for the one or more software objects identify a number of computing devices or quorum individual software applications necessary to receive object access authorizations in order to authorize access to the one or more software objects. The method of providing secure access further includes, wherein the user account includes a username, computing device information, a user email address, or additional user contact information. The method of providing secure access further includes, wherein the object access authorization also includes a time parameter, the time parameter identifying how long the user computing device may access the one of the one or more software objects. The method of providing secure access further includes wherein the quorum access software and the identity management software is located on a same computing device or a server and wherein the software application including the one or more software objects, the quorum access software and the identity management software is located on a same computing device or a server.

In exemplary embodiments, a method of providing secure access to one or more software workflows, includes generating quorum voting requirements for the one or more software workflows and storing the quorum voting requirements for the one or more software workflows in a quorum requirements table, wherein the quorum requirements table is resident in quorum access software; receiving a request for a user account and establishing the user account with user parameters for a user; generating a QR code for the user and communicating the QR code to the user computing device, the QR codes based at least in part on the user parameters; receiving an access request for the at least one of the one or more software workflows from the identity management system software; comparing the received access request and associated parameters to the user account with the user parameters stored in the quorum access software; generating a user token and communicating the user token to the identity management software if the associated parameters and the user parameters match; verifying, at the quorum access software, the user token; accessing the quorum requirements table for the at least one of the one or more software workflows and retrieving the quorum voting requirements and associated voting communication parameters; communicating, to a plurality of computing devices or quorum individual software packages, the access request for the at least one of the one or more software workflows based at least in part on the associated voting communication parameters; receiving, at the quorum access software, a number of workflow access authorizations for the at least one of the one or more software workflows requested by the user computing device; comparing the number of workflow access authorizations received from the plurality of computing devices or the quorum individual software packages for the at least one software workflows to the quorum voting requirements for the at least one software workflow; and if the number of workflow access authorizations is greater than or equal to the quorum voting requirements for the at least one software workflow, communicating a workflow access authorization command to the user computing device so that the user computing device can access the at least one of the one or more software workflows of the software application.

In exemplary embodiments, a system to provide secure access to one or more software objects, includes a user computing device; a quorum access software module configured to: generate quorum voting requirements for the one or more software objects and storing the quorum voting requirements for the one or more software objects in a quorum requirements table, wherein the quorum requirements table is resident in quorum access software module and one or more memory devices; receive a request for a user account and establish the user account with user parameters for a user and store the user account in the quorum access software module; generate a QR code for the user and communicate the QR code to the user computing device, the QR codes based at least in part on the user parameters; the user computing device configured to: scan the QR code that the user is utilizing to access the one or more software objects; log into a software application including the one or more software objects, and transmit an access request with respect to at least one of the one or more software objects; and an identity management system software module configured to: receive the access request at the identity management system software module, and transmit the received access request to the quorum access software module, wherein the quorum access software module is further configured to: compare the received access request and associated parameters to the user account with the user parameters stored in the quorum access software module; generate a user token and communicate the user token to the identity management software module if the associated parameters and the user parameters match; wherein the user computing device is further configured to: receive the user token from the identity management system software; and communicate the user token and the access request for the at least one of the one or more software objects to the quorum access software module.

In exemplary embodiments, the system of providing secure access to the one or more software objects further includes, wherein the quorum access software module is further configured to: verify, at the quorum access software module, the user token; access the quorum requirements table for the at least one of the one or more software objects and retrieving the quorum voting requirements and associated voting communication parameters; and communicate to a plurality of computing devices or quorum individual software packages, the access request for the at least one of the one or more software objects based at least in part on the associated voting communication parameters. In exemplary embodiments, the system of providing secure access to the one or more software objects further includes, wherein the quorum access software module is further configured to: receive a number of object access authorizations for the at least one of the one or more software objects requested by the user computing device; compare the number of object access authorizations received from the plurality of computing devices or the quorum individual software packages for the at least one software object to the quorum voting requirements for the at least one software object; and if the number of object access authorizations is greater than or equal to the quorum voting requirements for the at least one software object, communicate an object access authorization command to the user computing device so that the user computing device can access the at least one of the one or more software objects of the software application As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step. In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally, or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

The invention claimed is:

1. A method of providing secure access to one or more software objects, comprising:

generating quorum voting requirements for the one or more software objects and storing the quorum voting requirements for the one or more software objects in a quorum requirements table, wherein the quorum requirements table is resident in quorum access software;

receiving a request for a user account and establishing the user account with user parameters for a user;

generating a QR code for the user and communicating the QR code to the user computing device, the QR code based at least in part on the user parameters;

scanning the QR code on the user computing device that the user is utilizing to access the one or more software objects;

logging into, by the user computing device, a software application including the one or more software objects, and transmitting, by the user computing device, an access request with respect to at least one of the one or more software objects;

receiving the access request at the identity management system software, and transmitting the received access request to the quorum access software;

comparing the received access request and associated parameters to the user account with the user parameters stored in the quorum access software;

generating a user token and communicating the user token to the identity management system software if the associated parameters and the user parameters match;

receiving, at the user computing device, the user token from the identity management system software;

communicating, by the user computing device, the user token and the access request for the at least one of the one or more software objects to the quorum access software;

verifying, at the quorum access software, the user token;

accessing the quorum requirements table for the at least one of the one or more software objects and retrieving the quorum voting requirements and associated voting communication parameters;

communicating, to a plurality of computing devices or quorum individual software packages, the access request for the at least one of the one or more software objects based at least in part on the associated voting communication parameters;

receiving, at the quorum access software, a number of object access authorizations for the at least one of the one or more software objects requested by the user computing device;

comparing the number of object access authorizations received from the plurality of computing devices or the quorum individual software packages for the at least one software object to the quorum voting requirements for the at least one software object; and if the number of object access authorizations is greater than or equal to the quorum voting requirements for the at least one software object, communicating an object access authorization command to the user computing device so that the user computing device can access the at least one of the one or more software objects of the software application.

2. The method of providing secure access for the one or more software objects of claim 1, wherein the quorum voting requirements for the one or more software objects identify a number of computing devices or quorum individual software applications necessary to receive object access authorizations in order to authorize access to the one or more software objects.

3. The method of providing secure access of claim 1, wherein the user account includes a username, computing device information, a user email address, or additional user contact information.

4. The method of providing secure access of claim 1, wherein the object access authorization also includes a time parameter, the time parameter identifying how long the user computing device may access the one of the one or more software objects.

5. The method of providing secure access of claim 1, wherein the quorum access software and the identity management system software is located on a same computing device or a server.

6. The method of providing secure access of claim 1, wherein the software application including the one or more software objects, the quorum access software and the identity management system software is located on a same computing device or a server.

7. A method of providing secure access to one or more software workflows, comprising:

generating quorum voting requirements for the one or more software workflows and storing the quorum voting requirements for the one or more software workflows in a quorum requirements table, wherein the quorum requirements table is resident in quorum access software;

receiving a request for a user account and establishing the user account with user parameters for a user;

generating a QR code for the user and communicating the QR code to the user computing device, the QR code based at least in part on the user parameters;

receiving an access request for the at least one of the one or more software workflows from the identity management system software;

comparing the received access request and associated parameters to the user account with the user parameters stored in the quorum access software;

generating a user token and communicating the user token to the identity management system software if the associated parameters and the user parameters match;

verifying, at the quorum access software, the user token;

accessing the quorum requirements table for the at least one of the one or more software workflows and retrieving the quorum voting requirements and associated voting communication parameters;

communicating, to a plurality of computing devices or quorum individual software packages, the access request for the at least one of the one or more software workflows based at least in part on the associated voting communication parameters;

receiving, at the quorum access software, a number of workflow access authorizations for the at least one of the one or more software workflows requested by the user computing device;

comparing the number of workflow access authorizations received from the plurality of computing devices or the quorum individual software packages for the at least one software workflows to the quorum voting requirements for the at least one software workflows; and if the number of workflow access authorizations is greater than or equal to the quorum voting requirements for the at least one software workflow, communicating a workflow access authorization command to the user computing device so that the user computing device can access the at least one of the one or more software workflows of the software application.

8. A system to provide secure access to one or more software objects, comprising:

a user computing device;

a quorum access software module configured to:

generate quorum voting requirements for the one or more software objects and storing the quorum voting requirements for the one or more software objects in a quorum requirements table, wherein the quorum requirements table is resident in quorum access software module and one or more memory devices;

receive a request for a user account and establishing the user account with user parameters for a user and store the user account in the quorum access software module;

generate a QR code for the user and communicate the QR code to the user computing device, the QR code based at least in part on the user parameters;

the user computing device configured to:

scan the QR code that the user is utilizing to access the one or more software objects;

log into a software application including the one or more software objects, and transmit an access request with respect to at least one of the one or more software objects; and an identity management system software module configured to:

receive the access request at the identity management system software module, and transmit the received access request to the quorum access software module, wherein the quorum access software module is further configured to:

compare the received access request and associated parameters to the user account with the user parameters stored in the quorum access software module;

generate a user token and communicate the user token to the identity management software module if the associated parameters and the user parameters match;

wherein the user computing device is further configured to:

receive the user token from the identity management system software module; and communicate the user token and the access request for the at least one of the one or more software objects to the quorum access software module;

wherein the quorum access software module is further configured to:

verify, at the quorum access software module, the user token;

access the quorum requirements table for the at least one of the one or more software objects and retrieving the quorum voting requirements and associated voting communication parameters;

communicate to a plurality of computing devices or quorum individual software packages, the access request for the at least one of the one or more software objects based at least in part on the associated voting communication parameters;

receive a number of object access authorizations for the at least one of the one or more software objects requested by the user computing device;

compare the number of object access authorizations received from the plurality of computing devices or the quorum individual software packages for the at least one software object to the quorum voting requirements for the at least one software object; and if the number of object access authorizations is greater than or equal to the quorum voting requirements for the at least one software object, communicate an object access authorization command to the user computing device so that the user computing device can access the at least one of the one or more software objects of the software application.

\* \* \* \* \*